Oct. 10, 1933.　　　　F. H. OWENS　　　　1,929,988
DISSOLVER AND SHIFTER FOR OPTICAL SYSTEMS
Filed May 3, 1929
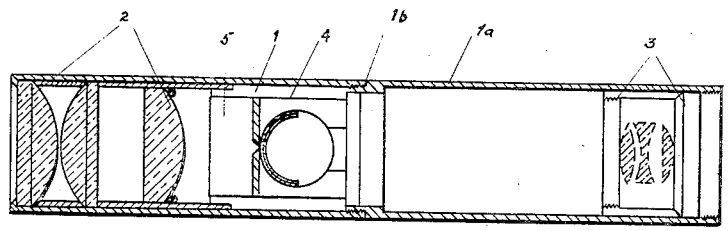
Fig.1.
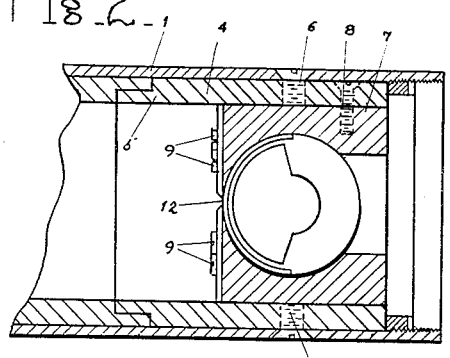
Fig.2.
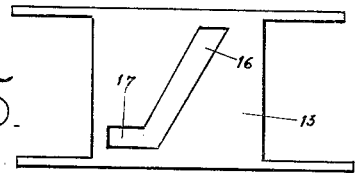
Fig.5.
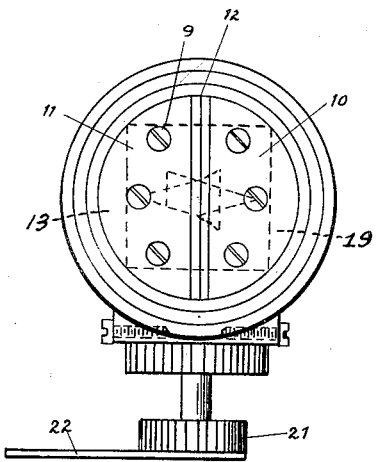
Fig.3.
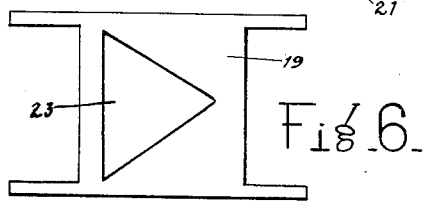
Fig.4.
Fig.6.
INVENTOR.
FREEMAN H OWENS
BY
ATTORNEY Patented Oct. 10, 1933

1,929,988

UNITED STATES PATENT OFFICE 1,929,988

DISSOLVER AND SHIFTER FOR OPTICAL SYSTEMS

Freeman H. Owens, New York, N. Y.

Application May 3, 1929. Serial No. 360,247

9 Claims. (Cl. 179—100.3)

This invention relates to improvements in dissolvers and shifters for optical systems, and more particularly for optical systems such as are used for recording and reproducing photographic sound records, the principal object of the invention being to provide a device of this character whereby the position of the light focused upon a film traveling past the optical system with relation to the width of a sound record on said film can be readily controlled.

A further object of the invention is to provide a simple and efficient means for gradually varying the length of the effective portion of the slit through which light passes to the film, thereby to produce a diminuendo or crescendo effect of the reproduced sound record carried by the film.

Other objects and advantages of the invention will appear as the description proceeds.

In the drawing accompanying this specification,

Figure 1 is a longitudinal sectional view through an assembled optical system embodying the features of the present invention;

Figure 2 is a broken away longitudinal sectional view illustrating on a larger scale the construction and relative disposition of the dissolver and shifter.

Figure 3 is an end view of the dissolver and shifter assembly and illustrating the means for operating these members;

Figure 4 is a sectional plan view through the housing of the shifter and dissolver, taken at right angles to Figure 2; and Figures 5 and 6 are plan views illustrating developments of the drums forming the shifter and dissolver respectively.

The same characters of reference designate the same parts in the different figures of the drawing.

In the art of reproducing photographic sound records it is well known that a beam of light is focused upon a narrow slit, the areal image of which is focused upon the sound track or record on the film as it moves past said beam. The rays passing through such sound record are of course modulated thereby and the modulated rays are then translated into electric impulses by a suitable light sensitive element, such as a photo electric cell, which impulses are then amplified and rendered audible by a loud speaker device. Inasmuch as the film moving mechanism and the reproducing units are well known and may be of any of a number of types and kinds, it has not been deemed necessary to show them in connection with my improved shifter and dissolver, which is useful in connection therewith.

It will be understood also that my invention is equally well adapted for use with a photographic sound recording means. I do not wish to be limited therefore to the particular combination or use to which my invention is put.

Referring to the drawing, 1, 1a designate a two-part tube, the parts having a threaded and shouldered connection as indicated at 1b in Figure 1. Within the tube is suitably mounted an optical system comprising a condenser lens assembly 2 and a focusing lens assembly 3, and between said lens assemblies is disposed within the tube 1 an exteriorly cylindrical member 4 having a longitudinally extending opening 5 preferably of rectangular form, said member being secured in the tube 1 by means of set screws 6. Within the opening 5 is disposed an exteriorly rectangular block 7, said block being secured against movement by means of a set screw 8 passing through the wall of the member 4 and into the block. The block 7 is bored longitudinally, and on the end thereof nearest the condenser lens are secured by means of screws 9 a pair of plates 10 and 11 forming between them the usual narrow slit 12 through which the light rays are projected by the condensing lens toward the focusing lens. The block 7 is also bored transversely thereof, said transverse bore being in communication with the slit 12 formed between the plates 10 and 11, and within this transverse bore are disposed the members about to be described and which I have termed herein respectively a shifter and a dissolver.

The shifter comprises a semi-tubular or longitudinally truncated drum 13 mounted at one end for rotation on a trunnion 14 formed on the inner surface of one of the end walls of the block 7, the drum having at its opposite end a tubular extension 15 which is mounted for rotation in the other end wall of the block 7, said drum being disposed so as to rotate immediately adjacent to the slit 12. In the body of the drum is formed an opening 16 extending obliquely across the drum, said opening merging at one end into an opening 17 extending in the direction of rotation of the drum. The form of these openings is shown best in Figure 6. The extension 15 is provided at its outer free end with a knob or button 18 for manually rotating the drum. By reason of this construction it will readily be seen that with the drum disposed adjacent to the slit 12, light will pass through only that portion of the length of the slit which is not covered by the drum, in other words, that portion which lies over the portion of the opening 16 in the drum which happens to be opposite the slit at any given time. Consequently, by rotation of the drum past the slit its oblique opening will shift the light-passageway along the length of the slit in a manner which will be readily understood, whereby the light may be focused on to a film at any portion of its width, while by rotating the drum until its opening 17 is in alignment with the slit the passage of light is confined to a small portion of the length of said slit, at one end thereof, whereby light will be focused on to the film only along a narrow strip adjacent to one edge of said film.

Within the drum 13 is disposed a similar drum 19 also mounted at its inner end for rotation on the trunnion 14 and secured at its opposite end to a rod or shaft 20 which passes through and is rotatable in the tubular extension 15 of the drum 13, said shaft being provided on its outer end with an operating knob or button 21 and preferably also with a lever 22. The drum 19 I have termed herein the dissolver, since its function is to gradually close the slit 12 against the passage of any light. To this end, the drum 19 rotates within the drum 13 in close contact therewith, and as shown herein is provided with an approximately V-shaped opening 23, from which it will be obvious that when the drum 19 is in such position that the widest part of the opening 23 coincides with the slit 12 and that portion of the opening 16 in drum 13 which happens to be in line with said slit, light will pass through the slit for the full width of the opening 23. If now the knob 21 is rotated so as to carry the apex of the V toward the slit, it is obvious that the length of the portion of the slit through which the light passes will be gradually diminished and finally entirely closed, this producing the diminuendo or gradually softening effects which are so desirable in the sound reproduction. It will be understood, of course, that the form of the openings in the drums will be determined by the effect which it is desired to produce. For instance, if instead of starting with full volume and gradually decreasing to nothing, or vice versa, which may be accomplished by rotating the drum 19 in the opposite direction, it is desired to start very softly, then increase to full volume and then again reduce to nothing this might be accomplished by providing a diamond shaped opening instead of a V as illustrated. And so, for any effect which it may be desired to obtain the provision of the proper combination of openings will accomplish the desired result. It will be understood, of course, that the size of the widest portion of the opening 23 will be determined according to the length of the slit used and the width or disposition of the photographic sound records on the film passing said slit.

It should be noted also that the operation of the shifter and dissolver drums may be automatically controlled instead of manually as herein shown and described.

I claim:

1. In an optical system for photographic sound recording and reproducing including, light projecting means, means having a fixed narrow slit in the path of projection, and rotatably adjustable means having an opening so disposed as to vary upon rotation the position of the light passage through said slit relatively to the length of the slit.

2. In an optical system for photographic sound recording and reproducing including, light projecting means, means having a fixed narrow slit in the path of projection, rotatable adjustable means having an opening so disposed as to vary upon rotation the position of the light passage through said slit relatively to the length of the slit, and means adjustable relatively to said slit and to said rotatble means to vary the width of the light passage through the slit.

3. In an optical system for photographic sound recording and reproducing including, light projecting means, means having a fixed narrow slit in the path of projecting, and a rotatable member having a portion provided with an opening movable across said slit upon rotation of said member for varying the position of the light passage through the slit relatively to the length of said slit.

4. In an optical system for photographic sound recording and reproducing including light projecting means, means having a fixed narrow slit in the path of projection, and a rotatable member having a portion provided with an opening movable across said slit upon rotation of said member for varying the position of the light passage through the slit relatively to the length of said slit, and a second member movable across said slit and having a V-shaped opening for varying the width of the light passage through the slit.

5. In an optical system for photographic sound recording and reproducing including, light projecting means, means having a slit in the path of projection, a member disposed adjacent to said slit and mounted for rotation across the longitudinal axis of the slit, said member having an opening therein adapted to register with varying portions of the length of the slit according to the adjusted position of said member, and means for rotating said member.

6. In an optical system, light projecting means, means having a slit in the path of projection, a member disposed adjacent to said slit and mounted for rotation across the longitudinal axis of the slit, and means for rotating said member, said member having an opening extending obliquely to the longitudinal axis of the slit whereby upon rotation of said member its opening will register with varying portions of the length of the slit.

7. In an optical system, light projecting means, means having a slit in the path of projection, a member disposed adjacent to said slit and mounted for rotation across the longitudinal axis of the slit, and means for rotating said member, said member having an opening extending obliquely to the longitudinal axis of the slit, and merging into an opening extending in a direction at right angles to said longitudinal axis, said right angular opening being adapted to register with a predetermined portion of the length of the slit and said oblique opening being adapted to register with varying portions of said slit according to the angular position of the rotatable member.

8. In an optical system for photographic sound recording and reproducing including, light projecting means, means having a slit in the path of projection, a member disposed for rotation across the longitudinal axis of said slit, said member having an angular opening therein adapted to register with said slit and to vary the width of the light passage through the slit according to the adjusted position of said rotatable member, and means for rotating said member.

9. In an optical system, light projecting means, means having a slit in the path of projection, a semi-tubular drum disposed adjacent to said slit and mounted for rotation across the longitudinal axis of the slit, said drum having in its wall an opening extending obliquely to the longitudinal axis of the slit whereby upon rotation of the drum its opening will register with varying portions of the length of the slit, a semi-tubular drum mounted for rotation in concentric relation with said first drum and having in its wall an opening adapted to register with the opening in said first drum, the opening in the second drum being of such form as to vary the width of the light passage through the slit and the opening in said first drum according to the angular position of the second drum, and independent means for rotating said drums.

FREEMAN H. OWENS.